US010667586B2

(12) United States Patent
Tu et al.

(10) Patent No.: US 10,667,586 B2
(45) Date of Patent: *Jun. 2, 2020

(54) PROTECTIVE CASE FOR MOBILE ELECTRONIC DEVICE WITH STORAGE COMPARTMENT AND PIVOT STAND

(71) Applicant: INCIPIO, LLC, Irvine, CA (US)

(72) Inventors: Peter Tu, Long Beach, CA (US); Timothy Hemesath, Clovis, CA (US); Andy Fathollahi, Corona Del Mar, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/936,064

(22) Filed: Mar. 26, 2018

(65) Prior Publication Data
US 2018/0213903 A1  Aug. 2, 2018

Related U.S. Application Data

(63) Continuation of application No. 14/921,923, filed on Oct. 23, 2015, now Pat. No. 9,936,780.

(60) Provisional application No. 62/067,953, filed on Oct. 23, 2014.

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/002* (2013.01); *A45C 2011/003* (2013.01); *A45C 2200/15* (2013.01)

(58) Field of Classification Search
CPC ............. A45C 11/00; A45C 2011/002; A45C 2011/003; A45C 2200/15; H05K 5/03; H05K 5/0226; H05K 5/0234; H04B 1/3888
USPC ...................................................... 206/45.23
See application file for complete search history.

*Primary Examiner* — Anthony D Stashick
*Assistant Examiner* — James M Van Buskirk (57) ABSTRACT

A protective case for a mobile device having a storage compartment for a user's personal items such as credit cards, license, cash, etc. is disclosed. The protective case includes a first or main panel and a second or sub-panel that are configured to cover the storage compartment and provide access thereto, via a hinged connection. Each panel may also function as independent pivot stand that can position the case in one or more operating/viewing positions.

20 Claims, 11 Drawing Sheets

PROTECTIVE CASE FOR MOBILE ELECTRONIC DEVICE WITH STORAGE COMPARTMENT AND PIVOT STAND

INCORPORATION BY REFERENCE TO RELATED APPLICATIONS

This application is a continuation of U.S. patent application Ser. No. 14/921,923, filed Oct. 23, 2015, which claims benefit under 35 U.S.C. § 119(e) from U.S. Provisional Patent Application No. 62/067,953, filed on Oct. 23, 2014. The above applications are hereby incorporated herein by reference in their entirety and are to be considered part of this specification.

BACKGROUND

Field

This invention relates to accessories for electronic devices and more specifically to user removable protective enclosures or cases for mobile electronic devices.

Description of the Related Art

Mobile consumer electronic products, such as smart and cellular phones, computing tablets, MP3/audio/video players, gaming devices and laptops are continuously and rapidly evolving to meet expanding consumer demands. Such devices are becoming more and more powerful, connected, and interactive, and employ bigger and bigger screens. For example, the recent generation of Apple's iPhone 6 Plus, introduced in September 2014, provides nearly double the screen space of the original iPhone ($1^{st}$ generation) introduced in 2007. With ever increasing size, users are looking to find more and more convenient ways to accommodate the transport and use of such devices together with their personal items.

The inventors here have recognized that there is a need for protective cases for such mobile electronic devices that are capable of providing a compartment to carry personal items (e.g., credit cards, cash, change, business cards, keys, etc.), while also providing multiple viewing/operating positions.

SUMMARY

Disclosed are numerous aspects of a unique and inventive protective case configured to receive, retain and protect a mobile device. Such mobile devices typically include a front face and a back face that define the height of the mobile device, a perimeter defined by top-end, bottom-end, right, and left sides residing between the front and back faces, and corners defined at the intersecting regions of the sides. The case may be for a mobile electronic device that is in the form of a tablet, a mobile phone, an MP3 audio player, a gaming device, or other portable handheld electronic device and may have one or more touchscreens on its front face and/or back face.

The protective case is in a first aspect comprised of two primary components, a bottom shell portion and an upper portion. The bottom shell portion is dimensioned and configured to reside below the back side or face of the electronic device. The upper portion generally extends from the bottom shell portion and is dimensioned and configured to cover at least a portion of one or more sides and/or a portion or a perimeter portion of the front face of the mobile device.

The bottom shell portion may be co-molded with the upper portion as respective first and second layers, wherein the bottom shell portion layer would be made of material that is more rigid than the co-molded upper portion layer. For example, the bottom shell portion may be formed of a polycarbonate (PC) material while the upper portion layer may be formed of thermoplastic urethane (TPU), a thermoplastic elastomer (TPE), an acrylonitrile butadiene styrene (ABS), nylon, silicone rubber or a combination thereof. Additional layers may also be co-molded or otherwise incorporated into the protective case.

The case is provided with a hinged storage compartment that is accessible via a first panel that opens outwardly from the bottom shell component. When the first panel is opened outwardly, the storage compartment is accessible and the first panel may be employed as pivot stand that can facilitate the case being positioned at a first angle or viewing/operation position. A second panel or sub-panel may also be hinged to the bottom shell component and/or to the first panel and may also open outwardly from the bottom shell and/or from the first panel to allow for limited access to the storage compartment and/or to provide another pivot stand that will allow the case to be positioned at a second angle that is the same or different than the first angle or viewing/operation position. Each of the first and second panels may be co-molded to the bottom component at a hinge. The second panel or sub-panel may be co-molded to the first panel and/or to the bottom shell portion at a hinge that is constructed of less rigid material than other regions of the panel and/or bottom shell. In one construction, the bottom shell and compartment panels are constructed of a first material and the upper shell and hinge are constructed of a second material that is softer or less rigid than the first material. In another aspect, the first panel is configured or otherwise dimensioned to mechanically attach or be mechanically retained by or to the bottom shell component. In another aspect, the second panel or sub panel is configured or otherwise dimensioned to mechanically attach or be mechanically retained by or to the bottom shell component and/or the first panel. The distal or free end (opposite end from that of the hinged end) of the second panel and/or the first panel may be layered or overlaid with the first softer material to mitigate slippage when the case is in the stand operating position.

It should be understood that each of the foregoing and various aspects, together with those set forth in the claims and summarized above and/or otherwise disclosed herein, including the drawings, may be combined to support claims for a device, apparatus, system, method of manufacture, and/or use without limitation.

BRIEF DESCRIPTION OF THE DRAWINGS

These and other features, aspects and advantages are described below with reference to the drawings, which are intended to illustrate, but not to limit, the invention. In the drawings, like reference characters denote corresponding features consistently throughout similar embodiments.

FIGS. 4A-4B illustrate different viewing/operating positions of the mobile device.

Each drawing is generally to scale and hence relative dimensions of the various layers can be determined from the drawings.

DETAILED DESCRIPTION OF THE PREFERRED EMBODIMENT

As summarized above and illustrated in the drawings, disclosed herein are various aspects of a protective case for a mobile device capable of providing user storage for personal items and different user viewing/operation positions while minimizing bulkiness and weight without sacrificing protection. Many of those aspects are summarized above and illustrated in the drawings.

Commonly disclosed in FIGS. 1-5 is a protective enclosure or case 200 for a mobile device 100, which individually and collectively illustrate, by way of example only, various of the configuration and construction aspects of the case. In this particular implementation, the case is configured for an Apple iPhone 6 plus mobile or smart phone device. It should be understood, however, that the case may be configured for any mobile device or electronic device, including but not limited to portable or cellular phones, PDAs, MPS or audio/video devices, gaming devices, laptop computers or computing tablet devices.

As best depicted in FIGS. 1A-1F, the protective case 200 includes front and back face walls 210 and 220 and left-side and right-side walls 230 and 240 and top-side and bottom-side walls 250 and 260. The side walls, 230, 240, 250, and 260 reside between the front and back faces. Each of the walls 210, 220, 230, 240, 250, and 260 are dimensioned to correspond in dimension to the front and back faces, and left, right, top and bottom sides of a mobile device 100, respectively. As illustrated in the drawings, the front face wall 210 includes an aperture that facilitates visibility to the front face touchscreen of the device 100 and allows for insertion and removal of the device into and out of the case 200.

Collectively the side walls 230, 240, 250 and 260 define a perimeter 270 between the front and back faces 210 and 220 of the protective case 200 and are dimensioned to receive and retain the mobile device 100 within the case 200 as depicted in the drawings.

Figure 1A:
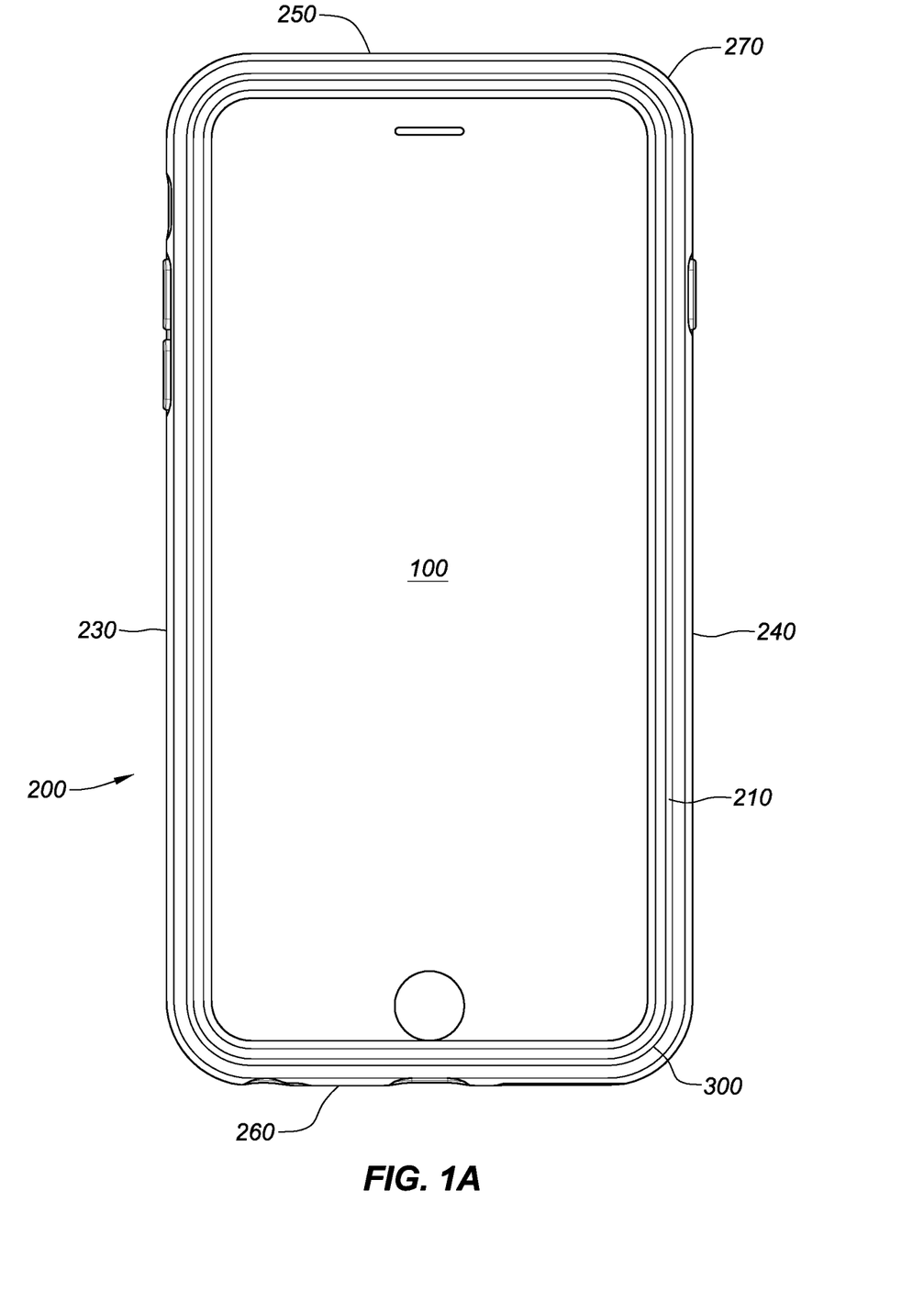
FIGS. 1A-1F are front face, back face, left side, right side, top side and bottom side views, respectively, of a protective case for a mobile device in accordance with the teachings herein. The protective case depicted is configured or dimensioned to receive and retain an Apple iPhone 6 plus® smart phone, which is depicted in FIGS. 1A-1F as being encased therein.
Figure 1B:
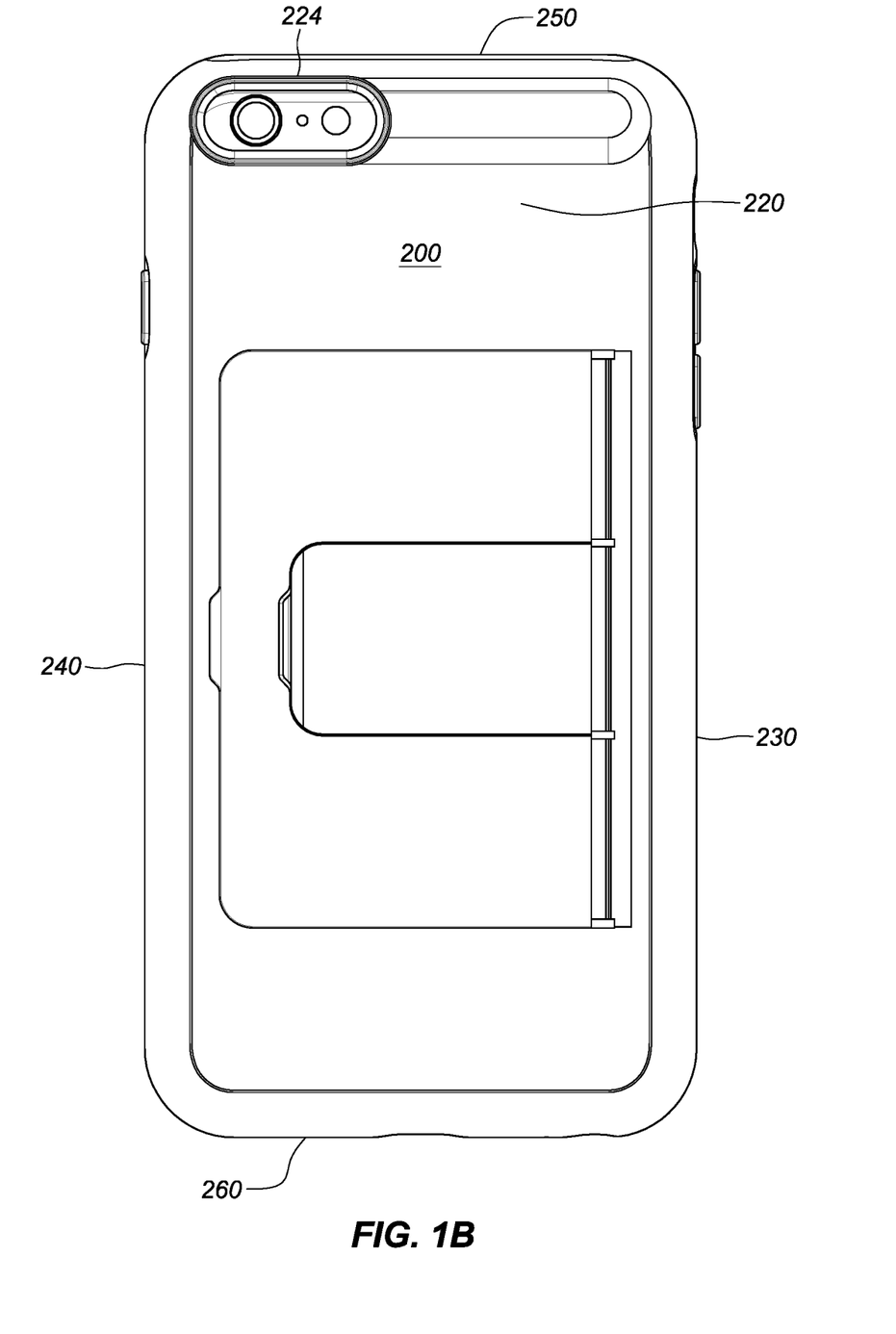
Figure 1C:
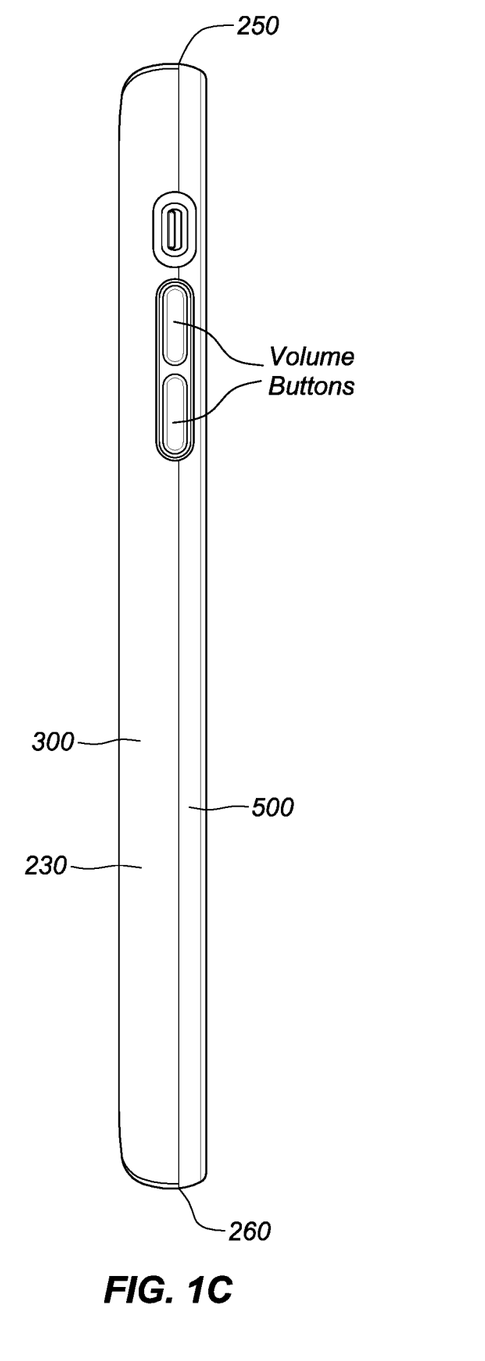
Figure 1D:
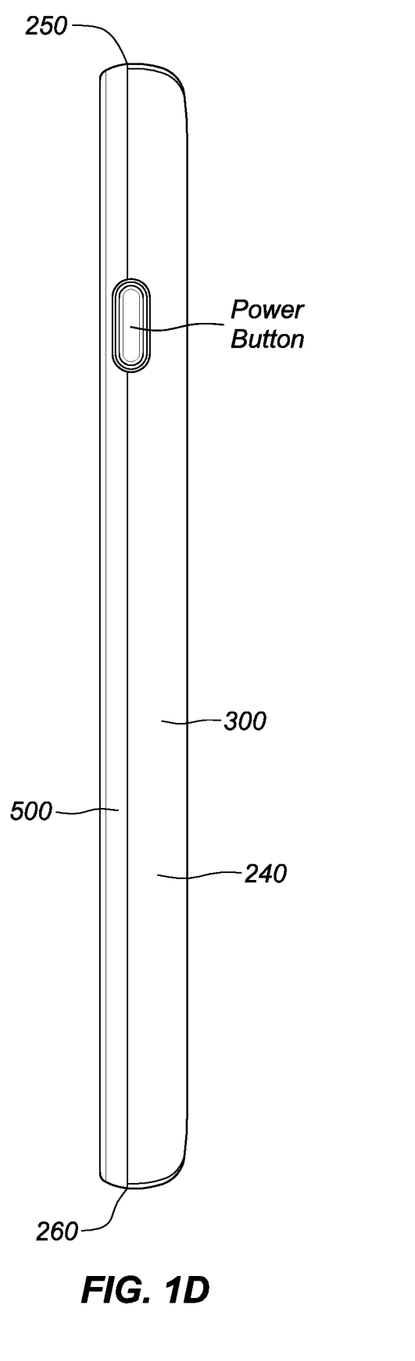
Figure 1E:
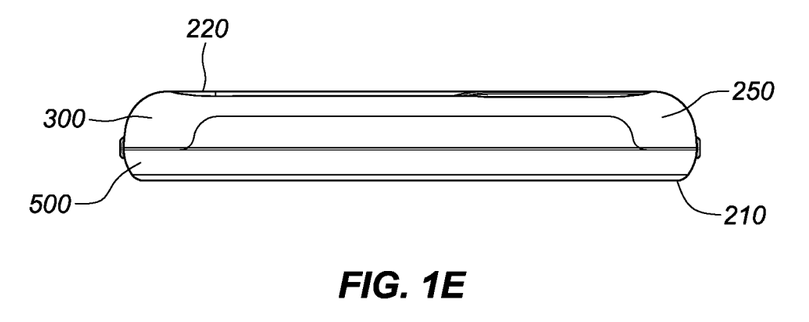
Figure 1F:
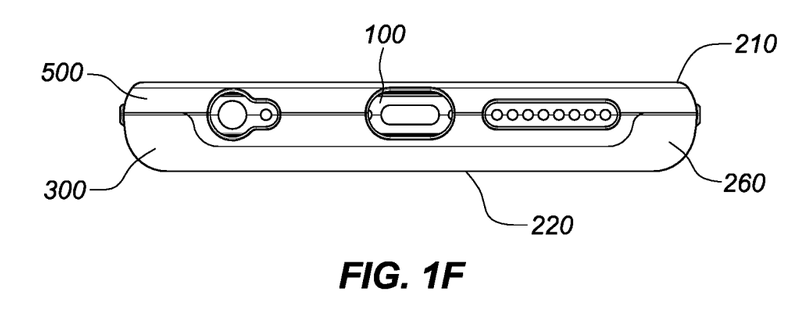
Figure 2:
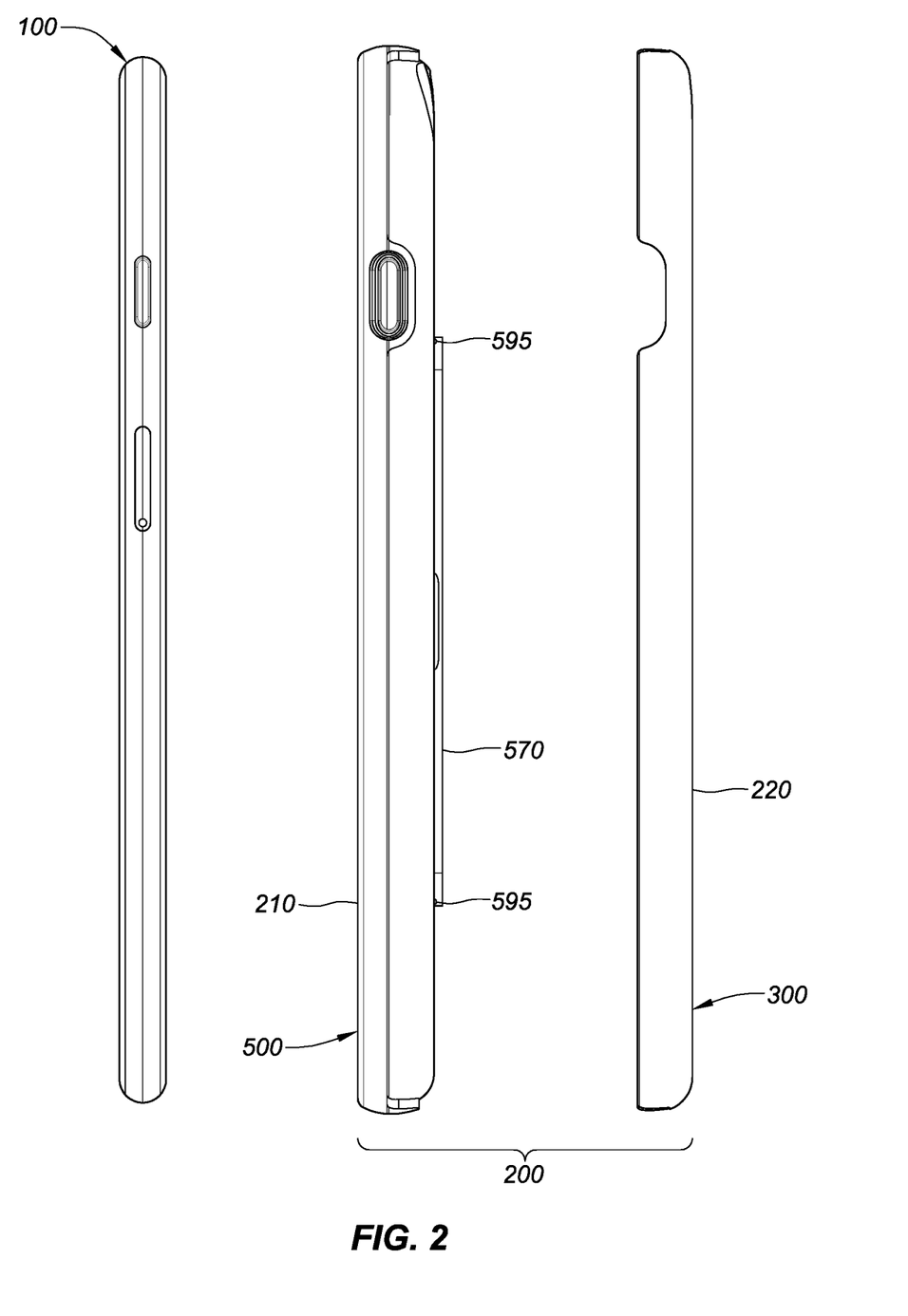
FIG. 2 is a right side view of the mobile device and the disassembled protective case illustrated in FIGS. 1A-1F illustrating the mobile device and components of the case.
Figure 3A:
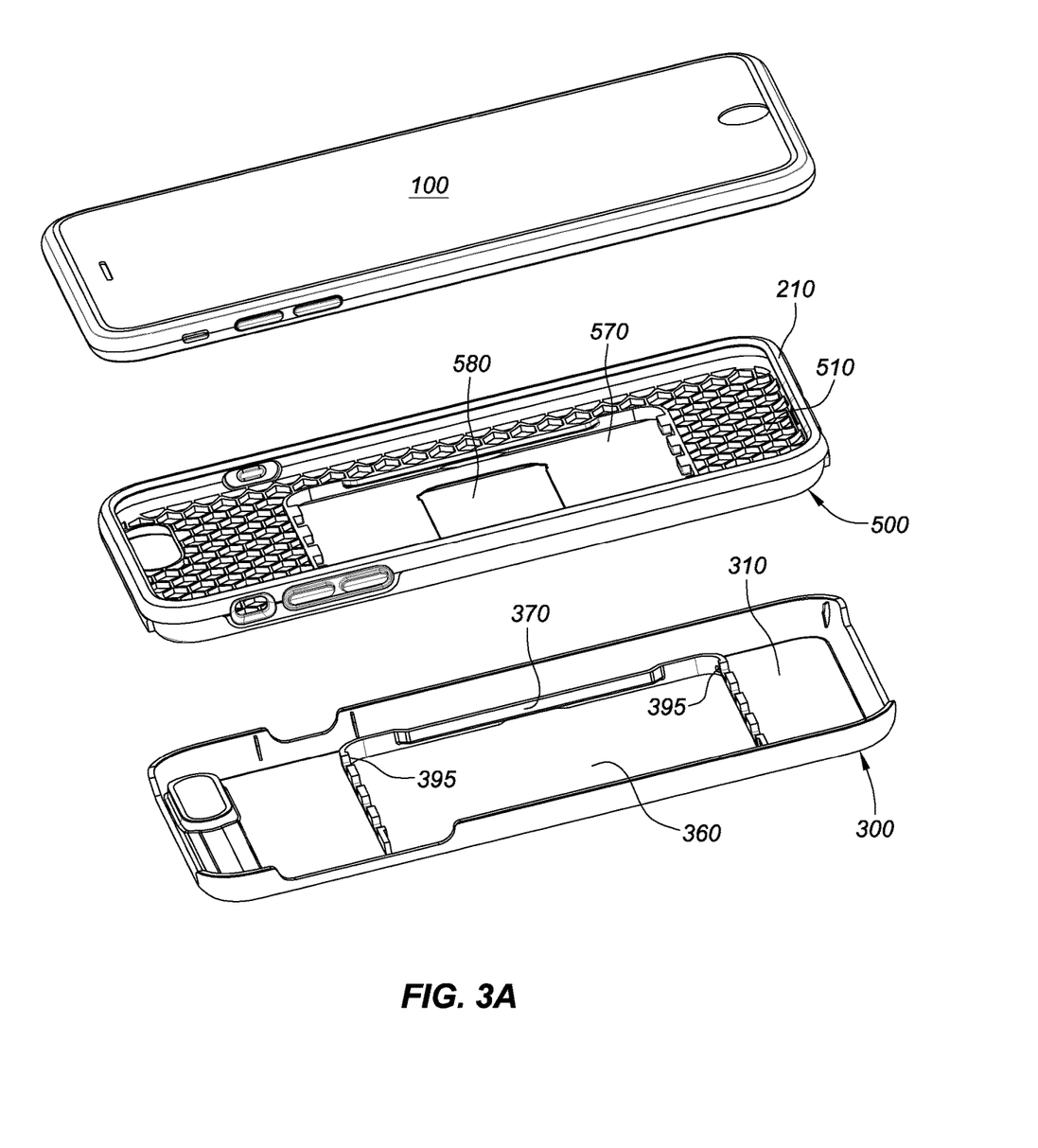
FIGS. 3A-3B are front and back perspective views, respectively, of the disassembled protective case illustrated in FIG. 2 showing the mobile device and the first and second layers that form the bottom shell and an upper portion of the case.
Figure 3B:
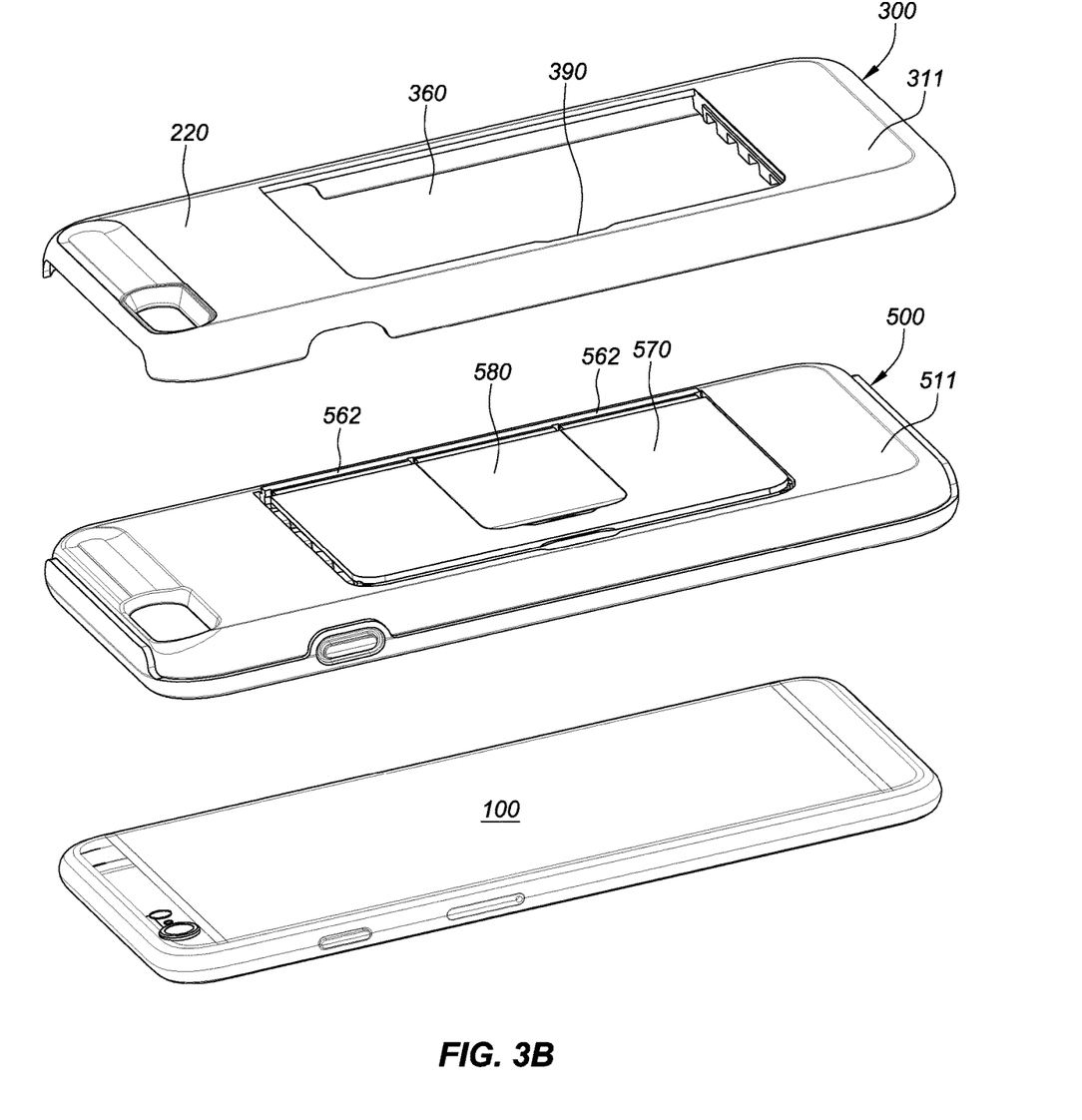

As best illustrated in FIGS. 2 and 3A-3B, a lower or bottom shell portion 300 is defined by first inner and outer surfaces 310, 311, respectively, and dimensioned to cover the back face of the mobile device 100. The first bottom shell 300 may be configured to extend to the perimeter of the mobile device 100 at the back face boundary, which is the perimeter defined by the intersection of the side walls and the back face of the mobile device 100.

The bottom shell portion 300 may be configured to cover the entire, a majority, half or less than half of the back face of the mobile device 100 and may be configured to extend to or around the entire, a majority, half or less than half of the perimeter of the mobile device 100 at the back face boundary.

In the illustrated implementation, the bottom shell portion 300 is configured to cover the back face of the mobile device 100, with the exception of the flash and camera lens window aperture 224 and the storage compartment 560 that is covered by the storage compartment panels 570 and 580 that are hinged and co-molded to the upper portion 500, which is in turn co-molded to the bottom shell portion 300. The bottom shell 300 in the illustrated implementation is dimensioned to extend about the entire perimeter of the back face of the mobile device 100. It should be understood however, that alternative configurations may be employed. Perimeter regions in the bottom shell 300 that reside between one or more of the corners may be removed. Mid-section regions of the bottom shell 300 may be removed to allow for access to, or user utilization of, user controls, additional touchscreen interface, and/or other device features (e.g., speakers, cameras, lights, microphone, etc.) that are located on the side walls and/or back face of the mobile device 100.

The second layer or upper portion 500 is also defined by inner and outer surfaces 510, 511, respectively. The upper portion 500 is generally dimensioned to cover the top, bottom, right and/or left sides of the mobile device 100. While in the illustrated embodiment, the upper portion 500 extends around the entire perimeter of the mobile device 100, it may be configured elsewise. Thus, it is contemplated that the upper portion 500 may cover the entire, a majority, half or less than half of the top, bottom, right and/or left sides of the mobile device and/or may be configured to extend around less than the entire, a majority, half or less than half of the perimeter of the mobile device 100 in any combination. The upper portion 500 includes the one or more mobile device control apertures that extend through the layer and/or include control buttons or interfaces that are dimensioned and positioned to allow access to and/or control to the underlying control buttons and/or ports (e.g., power button, volume button, ringer silent switch, headphone jack, microphone opening, speaker grill, and data/charging port) on the mobile device 100.

The upper portion 500 and bottom shell portion 300 define a storage area or compartment 560, which in the illustrated embodiment is sized to receive personal items such as, but not limited to, credit cards, driver's license, cash, etc.

Figure 4A:
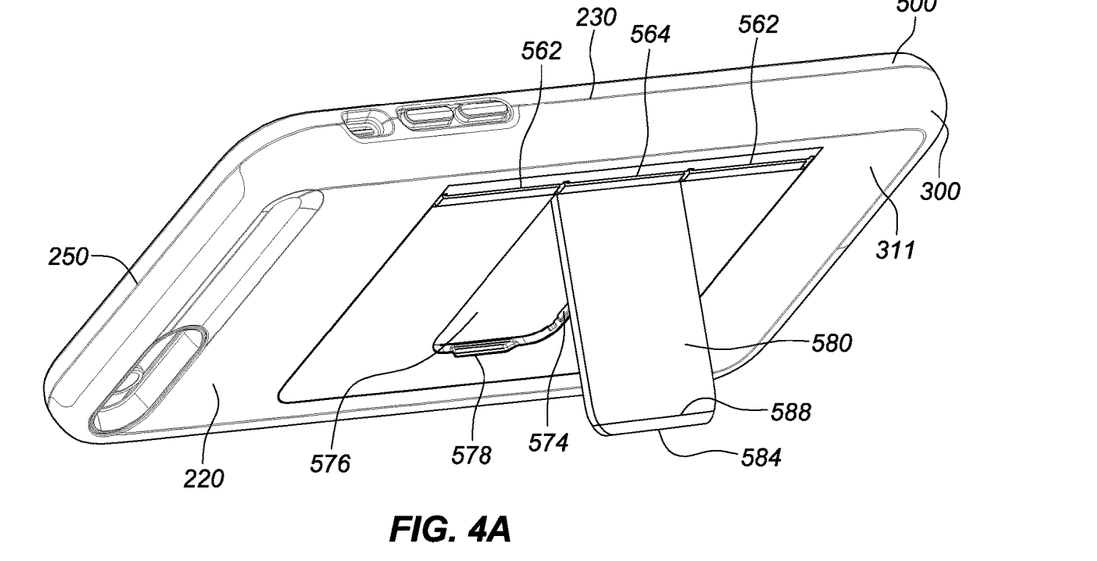
FIG. 4A shows that a storage compartment second panel or sub-panel being pivoted about a first hinge to provide a first viewing angle and FIG. 4B shows that another storage compartment t panel (together with the second panel or sub-panel) being pivoted about a second hinge to provide a second viewing angle that is more upright than the first viewing angle.
Figure 4B:
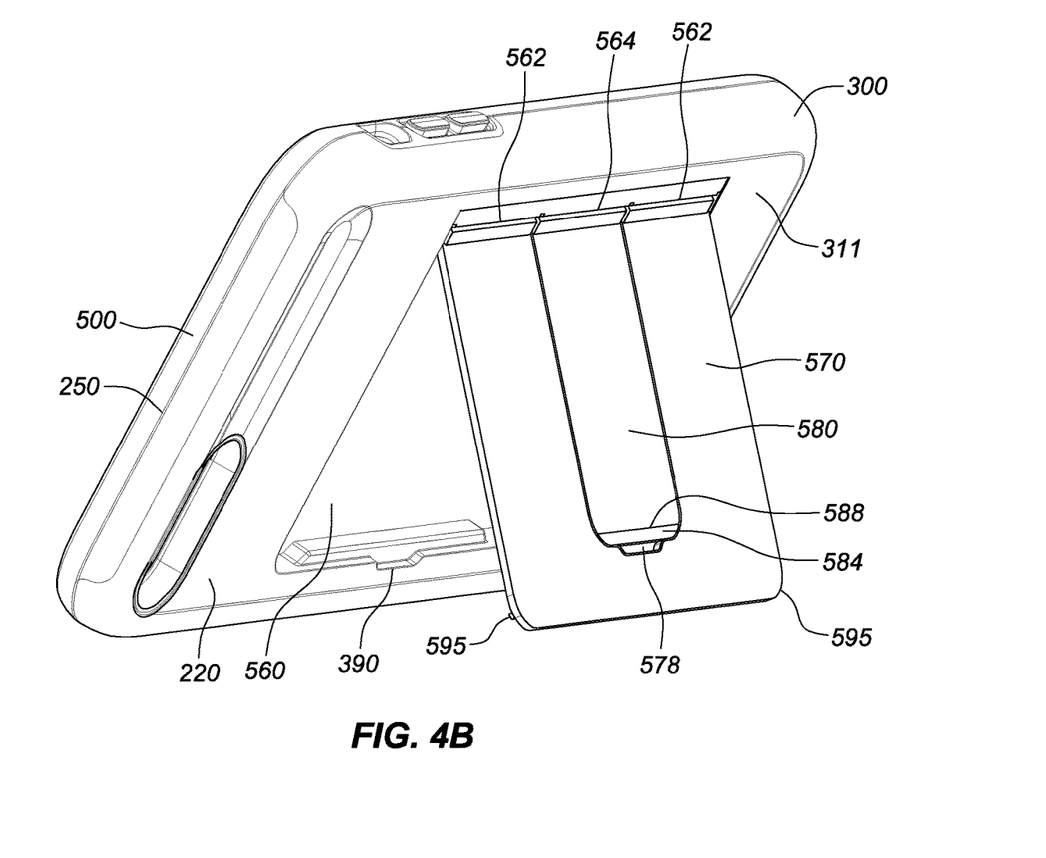

The bottom shell 300 includes an opening 360 sized to receive and retain in position a major or first storage compartment panel 570. The first storage compartment panel 570 is configured to open and close along hinges 562. The first storage compartment panel 570 is configured or dimensioned to cover the personal items stored in the storage area 560 when the first storage compartment panel 570 is positioned in a closed position, as best illustrated in FIGS. 1.B, 4A, and 5A-C. When the first storage compartment panel 570 is opened as shown in FIG. 4B, personal items such as credit cards can be inserted into or taken out from the storage area 560.

The bottom shell portion 300 may have a recessed area or slot 390 to facilitate the user opening and/or closing of panel 570. The bottom shell 300 may have one or more stops 370 to provide support to the panel as well as an ending position for the panel 570 when the panel 570 is in a closed position and may also include indents 395 that receive protrusions 595 to snap lock the panel 570 in the closed position.

In the illustrated implementation, the panel 570 includes a secondary opening 576 sized to receive a minor or second panel or sub-panel 580. The sub-panel 580 is configured to independently open or close along a hinge 564. When the sub-panel 580 is opened while panel 570 remains closed as shown in FIG. 4A, the case 200 is configured to be in a reading/viewing position while personal items can remain retained and protected safely within the storage area or compartment 560 that remains covered by the panel 570. The sub-panel 580 may also serve as a peek-a-boo window that allows the user to look into the compartment to confirm the contents thereof without risking those items falling out of the compartment or being fully exposed.

Panel 570 may have one or more stops 574 to provide an end or fully closed position for sub-panel 580 when sub-panel 580 is closed into panel 570. Therefore, when panel 570 is pivoted outward about hinge 562 as shown in FIG. 4B, sub-panel 580 can be retained therein and the two panels moved or pivoted together outwardly in a locked configuration. A soft tip or gripping region 584 (which may be co-molded onto the panel) is positioned at the free end 588 of the sub-panel 580. The free end of the sub panel 580 may have a recess area 586 to facilitate the user opening and pivoting or moving the sub-panel 580. This soft tip or gripping surface 584 may also provide additional friction to further stabilize the standing position on surface as shown in FIG. 4A when the case in put in a reading/viewing position. A slot or recessed area 578 may be configured on panel 570 to provide easy access to the free end of the sub panel 580.

Thus, the case 200 is provided with a storage compartment 560 that is easily accessible while also providing one or more reading/viewing position. Hence, when the sub-panel 580 is open and the case 200 is placed on a table or desk as shown in FIG. 4A, the case 200 provides the user a first reading/operation position. When the panel 570 is open and the case 200 is placed on a table or desk as shown in FIG. 4B, the case 200 can provide the user a second reading/operation position, which as illustrated in FIG. 4B positions the mobile device in a more upright or vertical position than the operating position illustrated in FIG. 4A. Also as illustrated in the drawings, the relative dimensions of the first and second panels 570 and 580 serve to facilitate retention of the personal items while allowing the user to stand-up the case 200 and the device 100 in an operating/viewing position, such as that illustrated in FIG. 4A. As illustrated in the drawings the first or primary panel 570 is more than double the size of the secondary panel or subpanel 580. The subpanel 580 is positioned centrally within the primary panel 570 so that the contents of the storage compartment 560 are enclosed around the perimeter by the primary panel 570 even when the sub-panel 580 is swung out at the hinge into the open stand position as illustrated in FIG. 4A.

While, the first and second or bottom and upper portions 300, 500 together with the pivot panel 570, pivot sub-panel 580, and the soft tip or gripping surface 584 may be co-molded all together to form an integrated case 200 construction or construct, it should be understood that it is contemplated that only portions of one or more of the portions or components may be co-molded, or each of the components may be separately formed and mechanically attached to one another by clips, snaps or latches between each of the components or between for example the bottom and upper portions additional. A combination of co-molding and mechanical attachment of the layers or portions thereof may also be employed. In the illustrated embodiment, the bottom shell portion and upper portion 300 and 500 including the storage compartment panels and sub-panels 570 and 580 and the hinges 562 and 564 are co-molded together, such that the bottom shell portion 300 and panels and sub panels 570 and 580 are made of a first material and the upper portion 500, hinges 562 and 564, and the gripping surface or tip 584 are made of a second material that is more elastic, softer and/or less rigid than the first material. The panels 570 and 580 are attached to the upper portion 500 via flanges 590 that are co-molded to hinges 562 and 564 respectively.

Figure 5A:
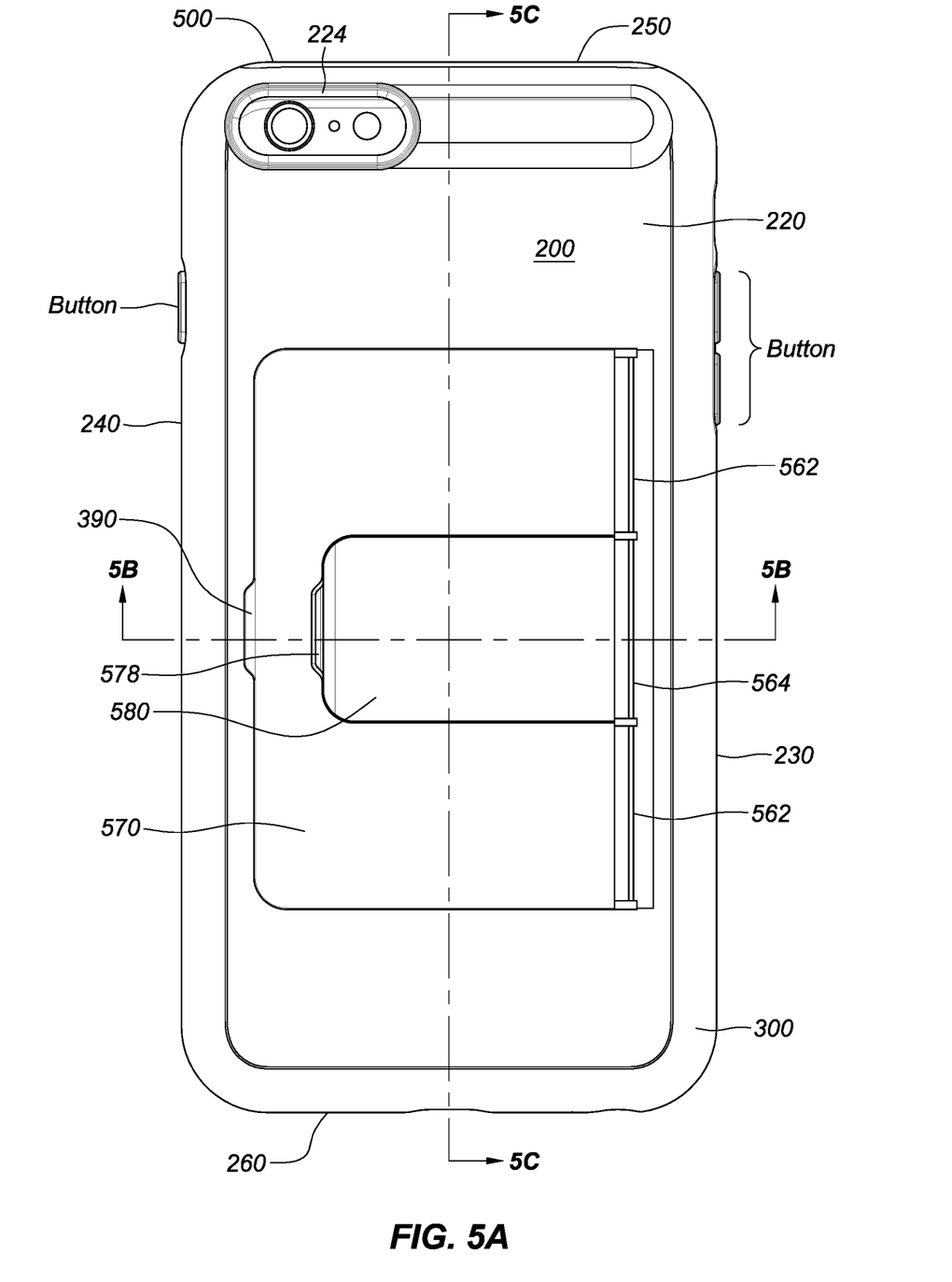
FIG. 5A is a back face view of the protective case illustrated in FIG. 1 with the storage compartment panels being in the fully closed position and the mobile device contained within the case.
Figure 5B:
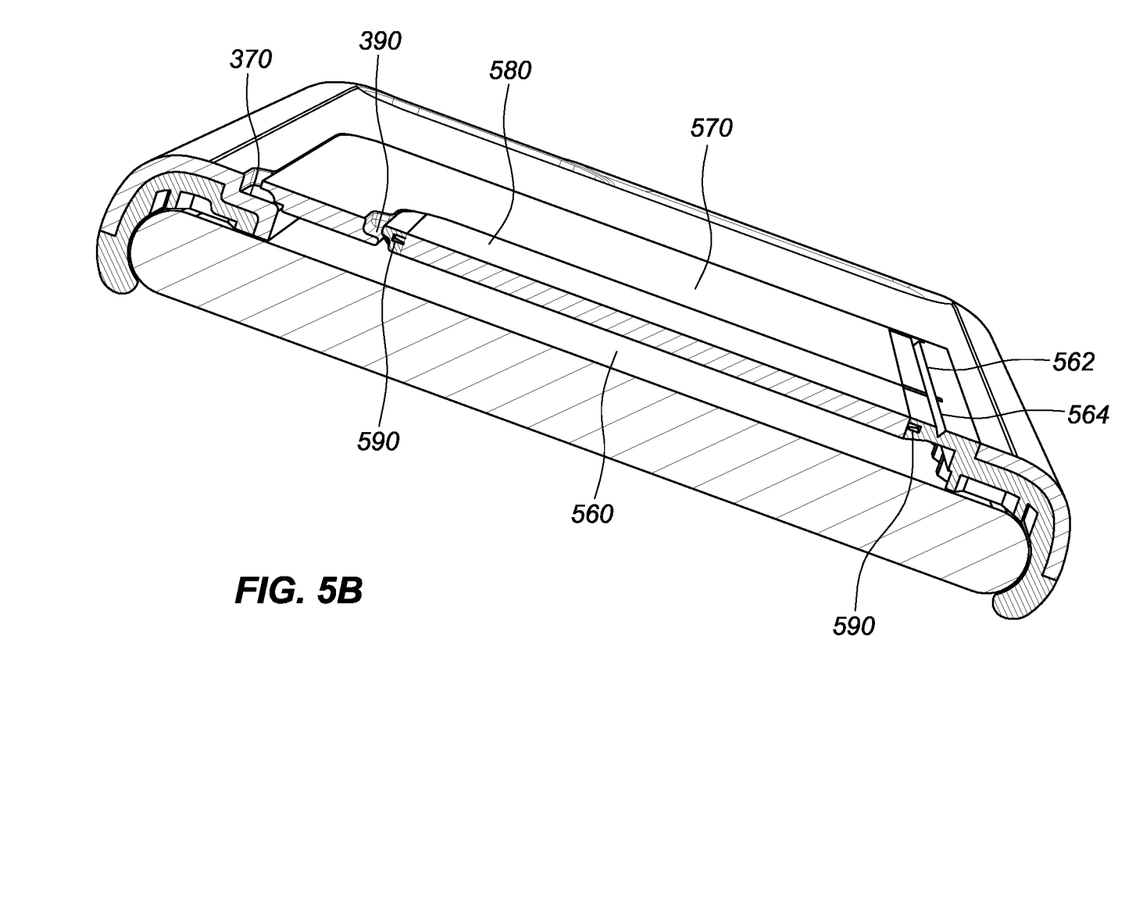
FIG. 5B is a cross-sectional view taken along line 5B-5B in FIG. 5A.
Figure 5C:
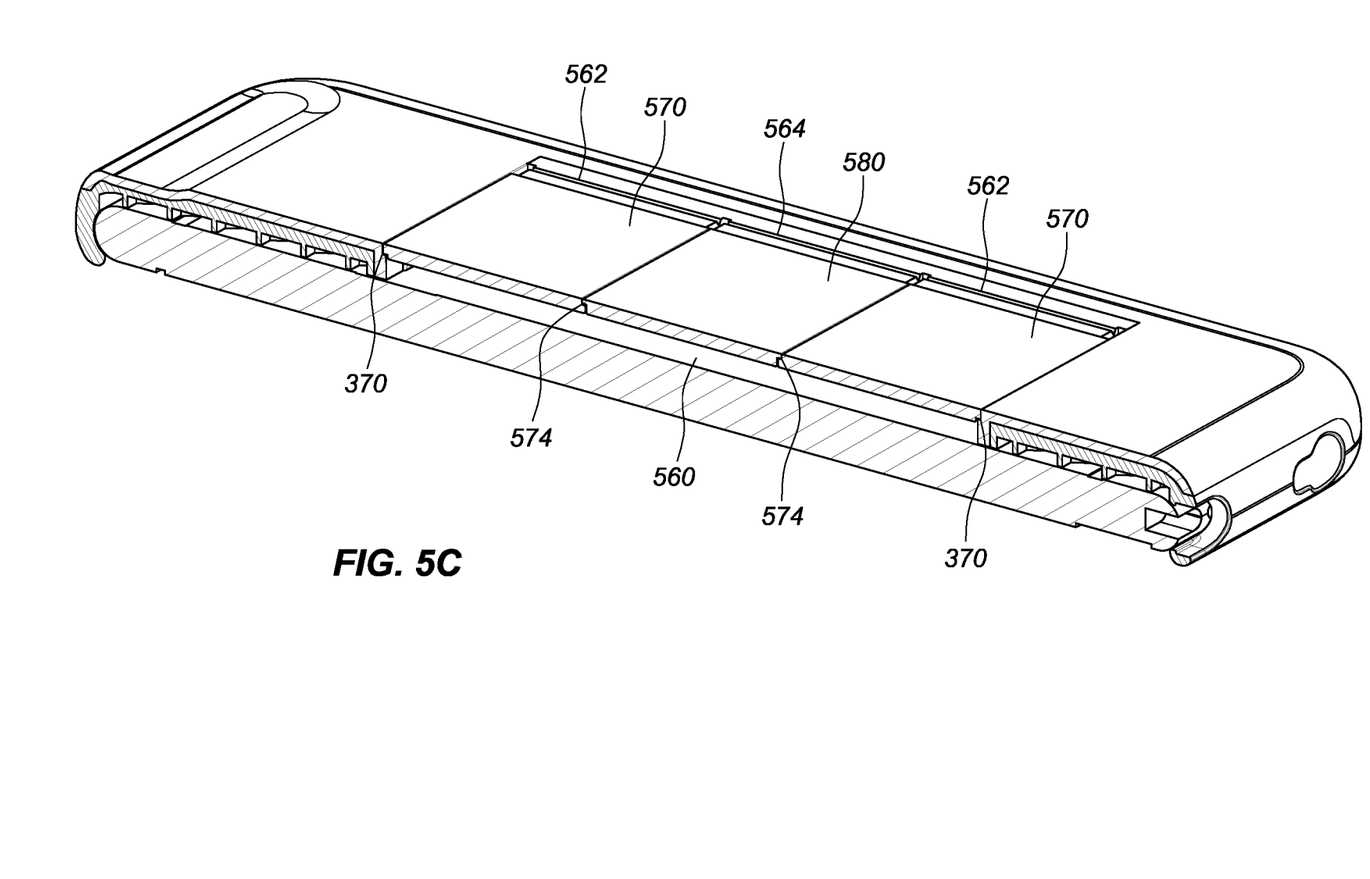
FIG. 5C is a cross-sectional view taken along line 5C-5C in FIG. 5A.

FIG. 5B best illustrates the flanges 590 that may be provided to facilitate the connection between the panel 570 and hinge 562, between the sub-panel 580 and hinge 564, and between the soft gripping surface or tip 584 and the sub-panel 580.

In a fully integrated or co-molded construction the case 200 would be properly dimensioned and have sufficient flexibility to allow the user to insert and remove the mobile device 100 without damage to the case 200. The flexibility may be implemented via the construction materials employed and the configuration of the co-molded layers or components. The panels 570 and 580 may be constructed so that they are biased toward the closed position. In this way the user would need to provide some force to open or swing the panels 570, 580 open when access to the storage compartment or when being used to support an operating or viewing position. The weight of the mobile device will tend to offset the bias of the panels 570 and/or 580 when used to support an operating/viewing position.

When the components are modular or separable from one another, the user may wrap the upper portion 500 around the mobile device 100 and then slip the bottom shell 300 in position around the upper portion 500 and the device 100. The clips, snaps or hooks or other mechanical attachments may, if needed, be formed or molded into: (a) two or more of the components at their perimeter regions, (b) the control buttons and corresponding apertures on the bottom or upper portions 300, 500 and/or (c) at any region where two layers or components are in contact or in proximity to one another. Thus, a combination of co-molding and/or mechanical attachment of the layers may be employed. It should be understood, however, that the shell portion 300 and upper portion 500 could be dimensioned so that the shell portion 300 snugly receives the upper portion 500 containing the mobile device 100 and the force of that snug fit by itself retains the upper portion 500 (containing the mobile electronic device 100) within the shell portion 300.

The materials that form the components may be selected based on their hardness or rigidity. For example, the bottom shell portion 300 may be made of a first material that has a first hardness or rigidity, and the upper portion 500 may be made of a second material that has a second hardness or rigidity that is different from the first hardness. In a preferred implementation, the first hardness is greater than the second hardness. In another embodiment the first rigidity is greater than the second rigidity.

In the present embodiment, the material that forms panel 570 and sub-panel 580 is the same as the material that forms the bottom shell 300. The material that forms the soft less rigid gripping surface or tip 584 and hinges 562 and 564 is the same softer less rigid material that forms the upper portion 500.

The bottom and upper portions 300, 500 may be formed of a composition comprised of one or more materials including but not limited to polycarbonate; thermoplastic urethane (TPU), thermoplastic elastomer (TPE), acrylonitrile butadiene styrene (ABS), nylon, metal, silicone rubber, or any combination thereof. For example, the bottom shell 300, which is the harder and more rigid of the two layers, may be formed of a composition comprised of polycarbonate (PC), a combination of polycarbonate and ABS, nylon, fiber reinforced plastic, and/or metal. The upper portion 500, which has a softer layer, may be formed, for example, of a composition comprised of TPU and/or TPE or combination thereof or other suitable material.

The bottom shell 300 may have a Shore A durometer hardness that is 50% or more greater than the second layer or upper portion 500, 40% or more greater than the second layer 500, 30% or more greater than the second layer, 20% or more greater than the second layer, or 10% or more greater than the second layer all+/−5% as measured using the American Society for Testing and Materials (ASTM) standard D2240. The first layer may have a Shore A durometer hardness of 100+/−15, 100+/−10, or 100+/−5, or 100 as measured using the American Society for Testing and Materials (ASTM) standard D2240. The second layer may have a Shore A durometer hardness of 65+/−15, 65+/−10, 65+/−10, or 65 as measured using the American Society for Testing and Materials (ASTM) standard D2240. It should be understood that the two layers may have a Shore A hardness that is comprised of any combination hardness described above.

In operation, the user would insert the mobile electronic device 100 into the case 200 through the more pliable less rigid upper portion that defines the upper section of the case 200 and the device compartment. Once inserted into the case 200, the user may hinge open panels 570, 580 to access the storage compartment and insert one or more credit cards or other personal items into the storage compartment 560 and then close panel 570 with or without closing panel 580. Once the panel 570 is closed the personal items are secured within the compartment 560. The user may then extend the sub panel 580 to support the case and the mobile device in the operating or viewing position depicted in FIG. 4A. Alternatively, the user may extend panel 570 to support the case and the mobile device in another more upright operating or viewing position as depicted in FIG. 4B. It should be understood that the storage compartment 560, may be formed of any shape or size. For example, the storage compartment 560 may be formed with greater volume to receive thicker items or may be formed with in different shapes to receive specific sized coins or memory sticks or other earphones or plugs. In one embodiment, the storage compartment is dimensioned to receive and store wireless or wired ear-buds and the controllers and supporting power source. In other embodiments, the storage compartment 560 may be dimensioned to receive and store pharmaceutical products, or a passport or make-up. The inner surfaces of the panels 570 and or 580 may include a mirror or reflective surface or a money clip for retention of cash.

Each of the foregoing and various aspects, or teachings herein together with those set forth in the claims and described in connection with the embodiments of the protective cases summarized above or otherwise disclosed herein including the drawings may be combined to form claims for a device, apparatus, system, method of manufacture, and/or use without limitation.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A user removable protective case for a mobile electronic device, the protective case comprising:
    a device compartment;
    a bottom shell portion;
    an upper portion that is co-molded to the bottom shell portion;
    a user storage compartment defined by the bottom shell portion and the upper portion, wherein the user storage compartment is dimensioned to receive one or more credit cards;
    a first panel that is co-molded to the upper portion at a first hinge, wherein the first panel is configured to lock closed into the bottom shell portion at a first end and swing outwardly at a second end along the first hinge to allow access to the storage compartment; and
    a second panel that is co-molded to the upper portion at a second hinge, wherein the second panel is configured to swing open and closed along the second hinge independently from the first panel, and wherein when the second panel is moved independently from the first panel, the second panel forms a support stand configured to allow positioning of the case in a first operating position,
    wherein the bottom shell portion is comprised of a first material and the upper portion is comprised of a second material different than the first material, and wherein the first material is more rigid than the second material,
    wherein when the first panel is pivoted outwardly along the first hinge, the first panel forms a pivot stand configured to allow positioning of the case in a second operating position which is different than the first operating position, and wherein the second operating position is configured to position in a more vertically upright angle than the first operating position.

2. The protective case of claim 1, wherein the first hinge and the second hinge are aligned in the same direction.

3. The protective case of claim 1, wherein the first panel has one or more stops to provide an end position for the second panel when the second panel is locked into the first panel.

4. The protective case of claim 1, wherein the first panel includes a hinged-end that is connected to the upper portion at the first hinge and an opposing free-end that is configured to swing outward when released from the bottom shell portion, and wherein the bottom shell portion includes a recessed region located at an area surrounding at least a portion of the free-end when the first panel is locked closed into the bottom shell portion.

5. The protective case of claim 1, wherein the bottom shell portion has one or more stops that support perimeter regions of the first panel when the first panel is in a closed position.

6. The protective case of claim 1, wherein the first material is polycarbonate.

7. The protective case of claim 1, wherein the second material is thermoplastic urethane.

8. The protective case of claim 1, wherein the first and second panels are comprised of the first material.

9. The protective case of claim 1, wherein the first hinge and the second hinge are aligned along a straight line.

10. The protective case of claim 1, wherein the upper portion defines the device compartment.

11. The protective case of claim 1, wherein the bottom shell portion and upper portion defines the device compartment.

12. The protective case of claim 1, wherein the upper portion extends beyond the edges of the bottom shell portion to form a wall structure.

13. The protective case of claim 1, wherein the bottom shell portion and upper portions include an aperture extending through each of the portions.

14. The protective case of claim 1, wherein the upper portion includes one or more depressible buttons.

15. The protective case of claim 1, wherein the upper portion includes one or more apertures.

16. A user removable protective case for a mobile electronic device, the protective case comprising:
   a device compartment;
   a bottom shell portion;
   an upper portion that is co-molded to the bottom shell portion;
   a user storage compartment defined by the bottom shell portion and the upper portion, wherein the user storage compartment is dimensioned to receive one or more credit cards;
   a first panel that is co-molded to the upper portion at a first hinge, wherein the first panel is configured to lock closed into the bottom shell portion at a first end and swing outwardly at a second end along the first hinge to allow access to the storage compartment; and
   a second panel that is co-molded to the upper portion at a second hinge, wherein the second panel is configured to swing open and closed along the second hinge independently from the first panel, and wherein when the second panel is moved independently from the first panel, the second panel forms a support stand configured to allow positioning of the case in a first operating position,
   wherein the bottom shell portion is comprised of a first material and the upper portion is comprised of a second material different than the first material, wherein the first material is more rigid than the second material, and wherein the first and second hinges are formed of the second material.

17. The protective case of claim 16, wherein the first hinge and the second hinge are aligned in the same direction.

18. The protective case of claim 16, wherein the upper portion defines the device compartment.

19. The protective case of claim 16, wherein the bottom shell portion and upper portion defines the device compartment.

20. The protective case of claim 16, wherein the upper portion extends beyond the edges of the bottom shell portion to form a wall structure.

* * * * *